Patented Apr. 28, 1925.

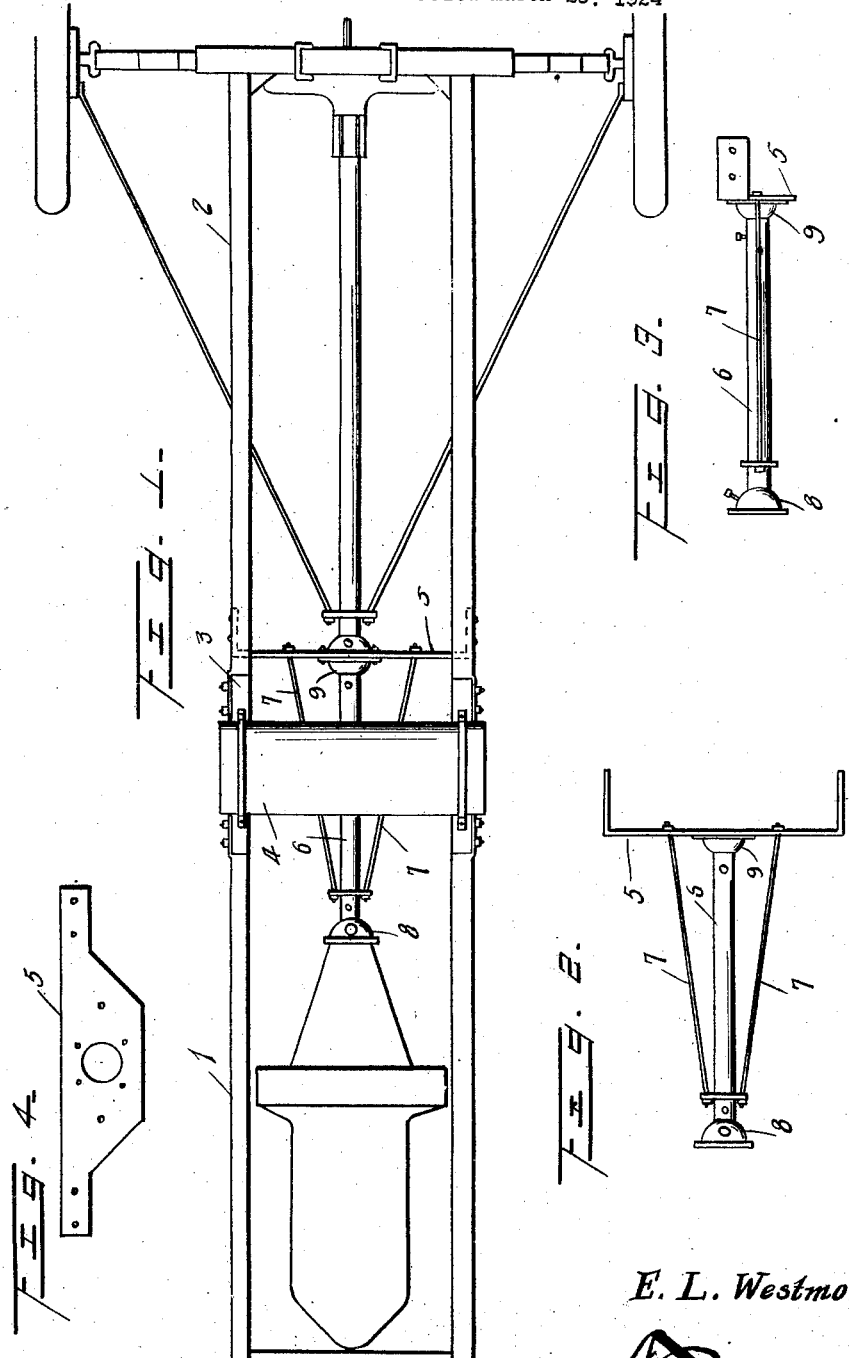

1,535,880

UNITED STATES PATENT OFFICE.

ENNES L. WESTMORELAND, OF OGDEN, UTAH.

CHASSIS EXTENSION FOR AUTOMOBILES.

Application filed March 29, 1924. Serial No. 702,830.

*To all whom it may concern:*

Be it known that I, ENNES L. WESTMORELAND, a citizen of the United States, residing at Ogden, in the county of Weber and State of Utah, have invented certain new and useful Improvements in Chassis Extensions for Automobiles; and I do hereby declare the following to be a full, clear, and exact description of the invention, such as will enable others skilled in the art to which it appertains to make and use the same.

The present invention has for its object the provision of an attachment whereby the chassis of an automobile may be extended to convert the same into a truck and which equalizes the load on the rear springs without weakening the same or changing the lines of the body and without necessitating the removal of the fenders or brackets.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of an automobile chassis embodying the invention,

Figure 2 is a top plan view of the attachment,

Figure 3 is a side view of the parts illustrated in Figure 2, and

Figure 4 is a detail view of the blank from which the crosspiece is formed.

Corresponding and like parts are referred to in the following description and designated in the several views of the drawings by like reference characters.

In accordance with the present invention, the longitudinal bars of the chassis are cut intermediate their ends forming the front sections 1 and the rear sections 2. Intermediate sections 3 are provided and form splice pieces which are bolted or otherwise securely attached to the inner ends of the sections 1 and 2, thereby resulting in lengthening the side bars the required extent. The fuel tank 4 is mounted upon the intermediate splice 3.

The extension aside from the splice pieces 3 comprises a cross member 5, an extension 6 for the drive shaft and drive shaft housing and braces 7, the latter connecting the ends of the cross member 5 with the front end of the drive shaft and housing extension 6. Universal joint members 8 and 9 are provided at opposite ends of the drive shaft and housing extension 6 and match and coact with complemental parts of the front and rear drive shaft sections between which the attachment is interposed. The cross member 5 may consist of a blank having end portions bent to be attached to the front ends of the rear sections 2 of the side bars.

It will be understood from the foregoing taken in connection with the accompanying drawings that the invention enables the chassis of an automobile to be lengthened when changing the same to form a truck or analogous carrier for merchandise, the frame when lengthened equalizing the load on the rear spring and preventing undue load coming upon the rear wheels, tires and axle.

What is claimed is:

An automobile chassis having its side bars in front and rear sections, splice elements connecting said sections, a drive shaft extension including a housing connected to the engine and to the ordinary drive shaft housing, the latter drive shaft housing terminating substantially in line with the rear sections of the side bars, a cross plate connecting said rear sections adjacent their forward ends and also connecting said drive shaft housing and drive shaft extension housing, brace elements extending from said drive shaft extension housing to said cross plate, and a fuel-tank supporting means carried by said splice members.

In testimony whereof I affix my signature in presence of two witnesses.

ENNES L. WESTMORELAND.

Witnesses:
W. H. HADLOCK,
N. K. ISRAELSON.